United States Patent
Sasaki et al.

(10) Patent No.: US 9,734,950 B2
(45) Date of Patent: Aug. 15, 2017

(54) MULTILAYER CERAMIC CAPACITOR

(71) Applicant: TAIYO YUDEN CO., LTD., Taito-ku, Tokyo (JP)

(72) Inventors: Shinichi Sasaki, Takasaki (JP); Atsushi Ozoe, Takasaki (JP); Atsushi Masuda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 14/965,810

(22) Filed: Dec. 10, 2015

(65) Prior Publication Data

US 2016/0189868 A1    Jun. 30, 2016

(30) Foreign Application Priority Data

Dec. 26, 2014   (JP) .................................. 2014-264273

(51) Int. Cl.
*H01G 4/30*       (2006.01)
*H01G 4/012*      (2006.01)
(Continued)

(52) U.S. Cl.
CPC ............. *H01G 4/30* (2013.01); *H01G 4/012* (2013.01); *H01G 4/385* (2013.01); *H01G 4/12* (2013.01); *H01G 4/232* (2013.01)

(58) Field of Classification Search
CPC ............ H01G 4/38; H01G 4/385; H01G 4/43
(Continued)

(56) References Cited

U.S. PATENT DOCUMENTS

| 7,075,776 B1 * | 7/2006 | Devoe ................... H01G 4/30 361/303 |
| 2015/0243440 A1 * | 8/2015 | Gong ...................... H01G 4/30 174/260 |

FOREIGN PATENT DOCUMENTS

| JP | 05152157 A * | 6/1993 |
| JP | 07142285 A * | 6/1995 |

(Continued)

OTHER PUBLICATIONS

A Notification of Reasons for Refusal issued by the Japanese Patent Office, dated Apr. 21, 2016, for Japanese counterpart application No. 2014-264273.
(Continued)

*Primary Examiner* — Eric Thomas
(74) *Attorney, Agent, or Firm* — Law Office of Katsuhiro Arai (57) ABSTRACT

In an embodiment, a capacitor body 11 of a multilayer ceramic capacitor 10 successively has a high-capacitance part CP1 and a low-capacitance part CP2 in the height direction, sharing one common internal electrode layer 14*co* among 30 internal electrode layers. The high-capacitance part CP1 includes 23 internal electrode layers 14-1 and one common internal electrode layer 14*co*, while the low-capacitance part CP2 includes one common internal electrode layer 14*co* and six internal electrode layers 14-2, where the facing distance FI2 of the seven internal electrode layers 14*co* and 14-2 included in the low-capacitance part CP2 is wider than the facing distance FI1 of the 24 internal electrode layers 14-1 and 14*co* included in the high-capacitance part CP1. The multilayer ceramic is capacitor capable of suppressing noise that may otherwise generate in a mounted state, while also reducing ESL in high-frequency ranges of several hundred MHz or higher.

4 Claims, 3 Drawing Sheets

(51) Int. Cl.
*H01G 4/38* (2006.01)
*H01G 4/12* (2006.01)
*H01G 4/232* (2006.01)

(58) Field of Classification Search
USPC .................................................. 361/328–330
See application file for complete search history.

(56) References Cited

FOREIGN PATENT DOCUMENTS

| | | | |
|---|---|---|---|
| JP | H08162368 A | | 6/1996 |
| JP | 10012475 A | * | 1/1998 |
| JP | 2012222290 A | * | 11/2012 |
| JP | 2013251551 A | | 12/2013 |

OTHER PUBLICATIONS

A Notification of Reason for Refusal issued by Korean Intellectual Property Office, dated Sep. 13, 2016, for Korean counterpart application No. 1020150138454.

* cited by examiner

| Evaluation sample | | SA1 | SA2 | SA3 | SAr |
|---|---|---|---|---|---|
| L (μm) | | 1180 | 1180 | 1180 | 1180 |
| W (μm) | | 680 | 680 | 680 | 680 |
| H (μm) | | 880 | 880 | 880 | 880 |
| CP1 | NOL14 | 386 | 386 | 386 | 386 |
| | T14 (μm) | 0.70 | 0.70 | 0.70 | 0.70 |
| | FI1 (μm) | 0.77 | 0.77 | 0.77 | 0.77 |
| CP2 | NOL14 | 50 | 42 | 20 | --- |
| | T14 (μm) | 0.70 | 0.70 | 0.70 | --- |
| | FI2 (μm) | 3.10 | 4.10 | 9.70 | --- |
| Ccp2/Ccp1 | | 0.05 | 0.03 | 0.004 | --- |

[Fig. 6]

MULTILAYER CERAMIC CAPACITOR

BACKGROUND

Field of the Invention

The present invention relates to a multilayer ceramic capacitor.

Description of the Related Art

In general, a multilayer ceramic capacitor has a capacitor body shaped roughly as a rectangular solid defined by length, width, and height, a first external electrode provided on one end of the capacitor body in the length direction, and a second external electrode provided on the other end of the capacitor body in the length direction. The capacitor body has a first protective part constituted by dielectrics, a capacitive part formed by multiple internal electrode layers stacked alternately with dielectric layers, and a second protective part constituted by dielectrics, all of which are arranged in layers in this order in the height direction. In addition, the multiple internal electrode layers included in the capacitive part are such that the edge, on the first external electrode side, of an odd-numbered layer from one end in the height direction is electrically connected to the first external electrode, while the edge, on the second external electrode side, of an even-numbered layer from one end in the height direction is electrically connected to the second external electrode.

In general, the aforementioned multilayer ceramic capacitor is mounted in a desired manner by connecting the bottom faces of the first external electrode and second external electrode in the height direction to two conductor pads on a circuit board, respectively, using solder. When voltage, especially alternating current voltage, is applied to the first external electrode and second external electrode through the respective conductor pads with the capacitor mounted this way, the capacitor body undergoes expansion/contraction based on electrostriction (primarily contraction that causes the capacitive part to contract in the length direction, and recovery from such contraction) and the stress accompanying this expansion/contraction is transmitted to the circuit board to induce vibration (primarily warping that causes the section between the conductor pads to form a concave, and recovery from such warping), and this vibration may lead to generation of sounds in audible frequency bands (between 20 Hz and 20 kHz).

Figure 1:
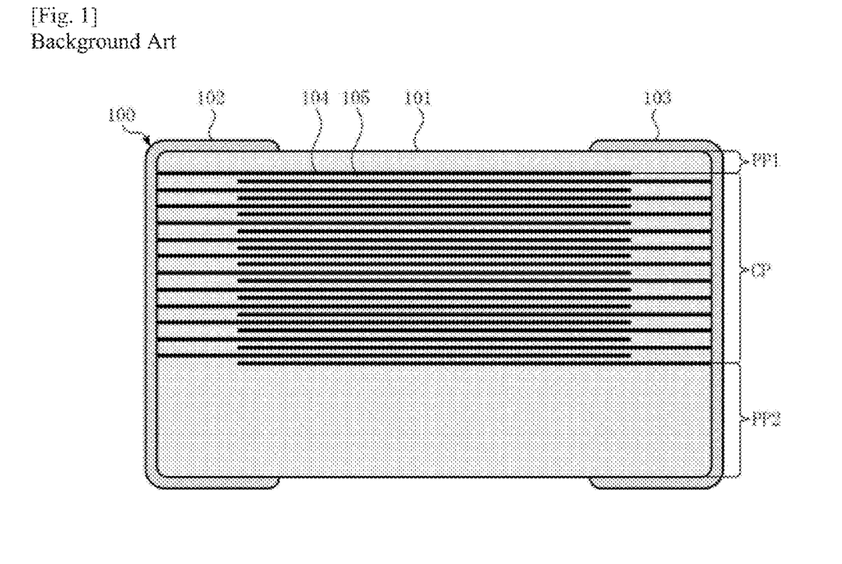
FIG. 1 is a longitudinal section view of a conventional multilayer ceramic capacitor.

As for the aforementioned sound generation (so-called "noise"), various countermeasures have been attempted, including known structures such as the multilayer ceramic capacitor 100 shown in FIG. 1 (refer to Patent Literature 1 listed later, for example). In FIG. 1, the numeral 101 represents a capacitor body, 102 represents a first external electrode, 103 represents a second external electrode, PP1 represents a first protective part, CP represents a capacitive part, PP2 represents a second protective part, 104 represents an internal electrode layer, 105 represents a dielectric layer, and the structural details are as described earlier. This multilayer ceramic capacitor 100 is structurally characterized in that the thickness of the second protective part PP2 is made greater than the thickness of the first protective part PP1 so as to shift the height-direction position of the capacitive part CP upward.

The multilayer ceramic capacitor 100 shown in FIG. 1 is mounted in a desired manner by connecting the bottom faces of the first external electrode 102 and second external electrode 103 in the height direction to two conductor pads on a circuit board, respectively, using solder. However, this multilayer ceramic capacitor 100 allows the capacitive part CP to separate upward from the respective conductor pads in a mounted state, which leads to an increase in ESL (equivalent series inductance) as the route of electrical current increases.

The aforementioned ESL has negative effects on signal transmissions in high-frequency ranges, specifically in high-frequency ranges of several hundred MHz or higher, and therefore when the multilayer ceramic capacitor 100 shown in FIG. 1 is used as a component of a high-frequency circuit, high-frequency signals are subject to higher transmission losses as they flow, which makes it difficult for the capacitor to demonstrate its intended capability.

[Patent Literature 1] Japanese Patent Laid-open No. 2013-251551

SUMMARY

An object of the present invention is to provide a multilayer ceramic capacitor capable of suppressing noise that may otherwise generate in a mounted state, while also reducing ESL in high-frequency ranges of several hundred MHz or higher.

Any discussion of problems and solutions involved in the related art has been included in this disclosure solely for the purposes of providing a context for the present invention, and should not be taken as an admission that any or all of the discussion were known at the time the invention was made.

The present invention, intended to achieve the aforementioned object, is a multilayer ceramic capacitor having a capacitor body shaped roughly as a rectangular solid defined by length, width, and height, a first external electrode provided on one of the opposing ends of the capacitor body, and a second external electrode provided on the other of the opposing ends of the capacitor body; wherein the capacitor body has a first protective part constituted by dielectrics, a capacitive part formed by an N number (N is an integer of 3 or greater) of internal electrode layers stacked alternately with dielectric layers, and a second protective part constituted by dielectrics, all of which are arranged in layers in this order in the height direction; the N number of internal electrode layers are such that each has an equivalent profile shape and the edge, on the first external electrode side, of an odd-numbered layer from one end in the height direction is electrically connected to the first external electrode, while the edge, on the second external electrode side, of an even-numbered layer from one end in the height direction is electrically connected to the second external electrode; the capacitive part successively has a high-capacitance part and a low-capacitance part in the height direction, sharing one common internal electrode layer among the N number of internal electrode layers other than the top layer and bottom layer; and the facing distance of the n2 number of internal electrode layers (n2 is an integer of 2 or greater, including the common internal electrode layer) included in the low-capacitance part is wider than the facing distance of the n1 number of internal electrode layers (n1 is an integer of 2 or greater, including the common internal electrode layer) included in the high-capacitance part.

According to the present invention, a multilayer ceramic capacitor capable of suppressing noise that may otherwise generate in a mounted state, while also reducing ESL in high-frequency ranges of several hundred MHz or higher, can be provided.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

(A) in FIG. 2 is a view from one side in the height direction of a multilayer ceramic capacitor to which the present invention is applied, while (B) in FIG. 2 is a view of the same multilayer ceramic capacitor from one side in the width direction.

DESCRIPTION OF THE SYMBOLS

10 - - - Multilayer ceramic capacitor, 11 - - - Capacitor body, PP1 - - - First protective part, PP2 - - - Second protective part, CP - - - Capacitive part, CP1 - - - High-capacitance part, CP2 - - - Low-capacitance part, 12 - - - First external electrode, 13 - - - Second external electrode, 14, 14-1, 14-2 - - - Internal electrode layer, 14co - - - Common internal electrode layer, FI1 - - - Facing distance of internal electrode layers in the high-capacitance part, FI2 - - - Facing distance of internal electrode layers in the low-capacitance part, 15, 15-1, 15-2 - - - Dielectric layer, SA1, SA2, SA3 - - - Evaluation sample.

DETAILED DESCRIPTION OF EMBODIMENTS

<<Basic Structure of Multilayer Ceramic Capacitor>>

Figure 2:
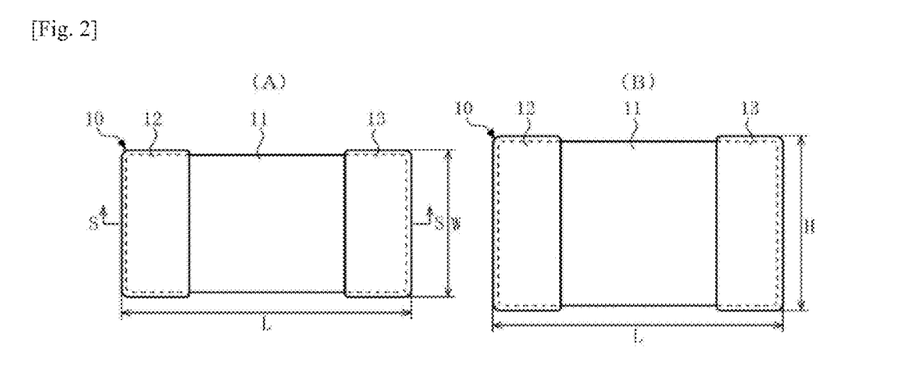
Figure 3:
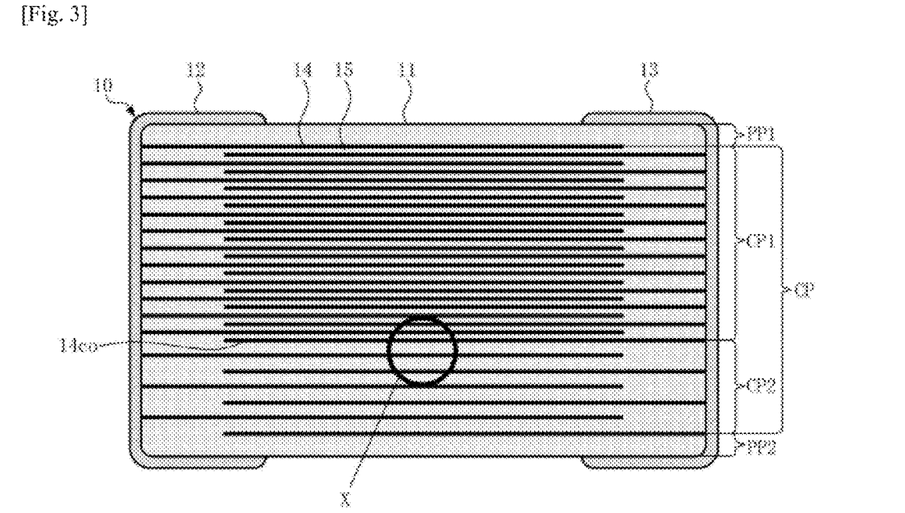
FIG. 3 is an enlarged section view cut along line S-S in (A) in FIG. 2.
Figure 4:
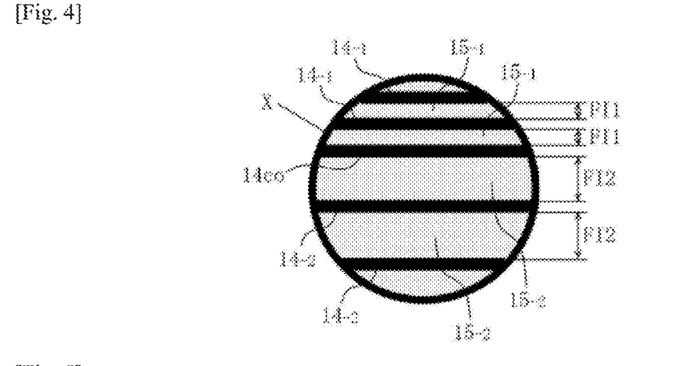
FIG. 4 is an enlarged view of X shown in FIG. 3.

First, the basic structure of a multilayer ceramic capacitor 10 to which the present invention is applied is explained by citing FIG. 2 to FIG. 4. It should be noted that, while FIG. 3 shows 30 internal electrode layers 14 mentioned below, this is for the convenience of illustration and does not limit the total number of the internal electrode layers 14 in any way.

The multilayer ceramic capacitor 10 shown in FIG. 2 to FIG. 4 has a capacitor body 11 shaped roughly as a rectangular solid defined by length, width, and height, a first external electrode 12 provided on one end of the capacitor body 11 in the length direction, and a second external electrode 13 provided on the other end of the capacitor body 11 in the length direction. This multilayer ceramic capacitor 10 forms roughly a rectangular solid shape satisfying the condition of "Length L>Height H>Width W" based on reference dimensions. Here, "reference dimensions" refers to design reference dimensions not including manufacturing tolerance, and the same definition applies to the reference dimensions used in the text below.

As shown in FIG. 3, the capacitor body 11 has a first protective part PP1 constituted by dielectrics, a capacitive part CP formed by 30 internal electrode layers 14 stacked alternately with dielectric layers 15, and a second protective part PP2 constituted by dielectrics, all of which are arranged in layers in this order in the height direction. The 30 internal electrode layers 15 each have an equivalent rectangular profile shape, and the length and width of each layer are smaller than the length and width of the capacitor body 11. Also, the 30 internal electrode layers 15 are such that the edge, on the first external electrode 12 side, of an odd-numbered layer from one end in the height direction (the top in FIG. 3) is electrically connected to the first external electrode 12, while the edge, on the second external electrode 13 side, of an even-numbered layer from one end in the height direction (the top in FIG. 3) is electrically connected to the second external electrode 13.

Additionally, as shown in FIG. 3, the capacitive part CP successively has a high-capacitance part CP1 and a low-capacitance part CP2 in the height direction (from the top to bottom in FIG. 3), sharing a common internal electrode layer 14co which is one layer among the 30 internal electrode layers 15 other than the top layer and bottom layer, or specifically the 24th layer from one end in the height direction (the top in FIG. 3). To be specific, the high-capacitance part CP1 includes 23 internal electrode layers 14-1 (refer to FIG. 4) and one common internal electrode layer 14co, while the low-capacitance part CP2 includes one common internal electrode layer 14co and six internal electrode layers 14-2 (refer to FIG. 4). In other words, the high-capacitance part CP1 and low-capacitance part CP2 exist successively in the height direction, separated by the common internal electrode layer 14co, and accordingly there is no non-capacitance-forming gap between the two.

Furthermore, as shown in FIG. 3 and FIG. 4, a facing distance FI2 of the seven internal electrode layers 14 (one common internal electrode layer 14co and six internal electrode layers 14-2) included in the low-capacitance part CP2 is wider than a facing distance FI1 of the 24 internal electrode layers 14 (23 internal electrode layers 14-1 and one common internal electrode layer 14co) included in the high-capacitance part CP1. It should be noted that the facing distance FI1 corresponds to the thickness of the dielectric layer 15-1 (refer to FIG. 4) included in the high-capacitance part CP1, while the facing distance FI2 corresponds to the thickness of the dielectric layer 15-2 (refer to FIG. 4) included in the low-capacitance part CP2.

In other words, because the facing distance FI2 of the seven internal electrode layers 14 included in the low-capacitance part CP2 is wider than the facing distance FI1 of the 24 internal electrode layers 14 included in the high-capacitance part CP1, and also because the number of internal electrode layers 14 included in the low-capacitance part CP2, or seven, is smaller than the number of internal electrode layers 14 included in the high-capacitance part CP1, or 24, a capacitance Ccp2 of the low-capacitance part CP2 becomes lower than a capacitance Ccp1 of the high-capacitance part CP1.

Furthermore, as shown in FIG. 2 and FIG. 3, the first external electrode 12 and second external electrode 13 each successively has an end face part covering an end face of the capacitor body 11 in the length direction, and a wrap-around part covering parts of the four sides adjoining the end face of the capacitor body 11 in the length direction (both sides in the width direction and both sides in the height direction).

It should be noted that, preferably, the first protective part PP1, respective dielectric layers 15 and second protective part PP2 are constituted by dielectric ceramics of roughly the same composition and roughly the same dielectric constant. Here, "dielectric ceramics of roughly the same composition and roughly the same dielectric constant" refers to dielectric ceramics of the same composition and dielectric constant, as well as dielectric ceramics wherein at least one of their composition and dielectric constant differs slightly in an allowable range to due to differences in the sintered degree, etc. For such dielectric ceramics, preferably dielectric ceramics whose primary constituent is barium titanate, strontium titanate, calcium titanate, magnesium titanate, calcium zirconate, calcium titanate zirconate, barium zirconate, titanium oxide, etc., or more preferably dielectric ceramics of ∈>1000 or Class 2 (high dielectric constant type), are used. In addition, preferably such dielectric ceramics contain, as a secondary constituent in addition to the aforementioned primary constituent, at least one of (1) a compound of manganese, niobium, molybdenum, vanadium, tungsten, or other transitional metal, (2) a compound of gadolinium, dysprosium, holmium, erbium, ytterbium, or other rare earth metal, (3) a magnesium compound, and (4) a silicon compound such as silicon dioxide. The content of this secondary constituent is preferably 0.1 to 0.5 mol relative to 100 mol of the primary constituent in the case of a transitional metal compound, preferably 0.1 to 1.0 mol relative to 100 mol of the primary constituent in the case of a rare earth metal compound, preferably 0.1 to 0.5 mol relative to 100 mol of the primary constituent in the case of a magnesium compound, or preferably 0.1 to 1.5 mol relative to 100 mol of the primary constituent in the case of a silicon compound.

Additionally, the respective internal electrode layers 14 are preferably formed by good conductors of roughly the same composition. Here, "good conductors of roughly the same composition" refers to good conductors of the same composition, as well as good conductors wherein their composition differs slightly within an allowable range due to differences in the sintered degree. For such good conductors, preferably good conductors whose primary constituent is nickel, copper, palladium, platinum, silver, gold, or alloy thereof, etc., can be used.

Furthermore, the first external electrode 12 and second external electrode 13 each have a two-layer structure comprising a base film contacting the exterior surface of the capacitor body 11 and a surface film contacting the exterior surface of the base film, or multi-layer structure comprising a base film, a surface film, and at least one intermediate film in between. The base film is formed by a baked film, for example, and for this baked film preferably a good conductor whose primary constituent is nickel, copper, palladium, platinum, silver, gold, or alloy thereof, etc., can be used. The surface film is formed by a plated film, for example, and for this plated film preferably a good conductor whose primary constituent is tin, palladium, gold, zinc, or alloy thereof, etc., can be used. The intermediate film is formed by a plated film, for example, and for this plated film preferably a good conductor whose primary constituent is platinum, palladium, gold, copper, nickel, or alloy thereof, etc., can be used.

<<Basic Method for Manufacturing Multilayer Ceramic Capacitor>>

Next, the basic method for manufacturing the multilayer ceramic capacitor 10 shown in FIG. 2 to FIG. 4 is explained. Here, the basic manufacturing method is explained by citing an example where the first protective part PP1, respective dielectric layers 15 and second protective part PP2 are formed by dielectric ceramics whose primary constituent is barium titanate, while the respective internal electrode layers 14 are formed by good conductors whose primary constituent is nickel; however, these materials were selected for the convenience of explanation and do not limit in any way what the respective materials should be.

For the manufacturing, a ceramic slurry containing barium titanate powder (primary constituent), secondary constituents, ethanol (solvent), polyvinyl butyral (binder), and dispersant and other additives, etc., is prepared, along with a metal paste containing nickel powder, terpineol (solvent), ethyl cellulose (binder), and dispersant and other additives. The secondary constituents of the ceramic slurry are 0.3 mol of manganese oxide, 0.5 mol of holmium oxide, and 1.0 mol of silicon dioxide relative to 100 mol of barium titanate.

Next, a die-coater, gravure coater or other coating machine, and a drying machine, are used to coat the ceramic slurry onto the surface of a carrier film and then dry it to produce a first green sheet. Also, a screen printer, gravure printer, or other printing machine, and a drying machine, are used to print the metal paste onto the surface of the first green sheet in matrix or zigzag patterns and then dry it to produce a second green sheet on which internal electrode layer patterns have been formed.

Next, a laminating machine such as a movable pickup head with a stamping blade and heater is used to stack unit sheets that have been stamped out of the first green sheet until a specified number is reached, and then thermally compress them together to produce a part corresponding to the second protective part PP2.

Next, a laminating machine similar to the one mentioned above is used to stack a unit sheet that has been stamped out of the first green sheet, on top of a unit sheet (including the internal electrode layer patterns) that has been stamped out of the second green sheet, and then thermally compress them together, and this process is repeated until a specified number is reached, to produce a part corresponding to the low-capacitance part CP2.

Next, a laminating machine similar to the one mentioned above is used to stack unit sheets (including the internal electrode layer patterns) that have been stamped out of the second green sheet until a specified number is reached, and then thermally compress them together to produce a part corresponding to the high-capacitance part CP1.

Next, a laminating machine similar to the one mentioned above is used to stack unit sheets that have been stamped out of the first green sheet until a specified number is reached, and then thermally compress them together to produce a part corresponding to the first protective part PP1.

Next, a hot hydrostatic press, mechanical or hydraulic press, or other final compression machine is used to thermally compress the aforementioned stacked parts finally, to produce an unsintered laminated sheet.

Next, a blade dicer, laser dicer, or other cutting machine is used to cut the unsintered laminated sheet in a lattice pattern to produce unsintered chips corresponding to capacitor bodies 11.

Next, a tunnel sintering furnace, box sintering furnace, or other sintering machine is used to sinter (including binder removal and sintering) the many unsintered chips in a reducing ambience or ambience of low partial oxygen pressure based on a temperature profile according to barium titanate and nickel, to produce capacitor bodies 11.

Next, a roller coater, dip coater, or other coating machine, and a drying machine, are used to apply a metal paste (the aforementioned metal paste is carried over) on both ends of the capacitor body 11 in the length direction and then dry it, followed by baking in an ambience similar to those mentioned above to form a base film, and electroplating or other plating to form a surface film, or an intermediate film and surface film, on top of the base film, to produce a first external electrode 12 and second external electrode 13. It should be noted that the base film may be produced by coating the electrode paste on both ends of the unsintered chip in the length direction, drying it, and then sintering the paste together with the unsintered chip.

In the aforementioned "step to produce a part corresponding to the low-capacitance part CP2," a unit sheet that has been stamped out of the first green sheet is stacked on top of a unit sheet (including the internal electrode layer patterns) that has been stamped out of the second green sheet, repeatedly until a specified number is reached, to make sure the facing distance FI2 would become wider than the facing distance FI1; however, a part corresponding to the low-capacitance part CP2 may also be produced by preparing in advance a third green sheet constituted by a separate green sheet which is thicker than the first green sheet and which has internal electrode layer patterns formed on its surface, stacking units sheets (including the internal electrode layer patterns) that have been stamped out of the third green sheet until a specified number is reached, and then thermally compressing them together.

<<Specifications of Evaluation Samples>>

Figure 5:
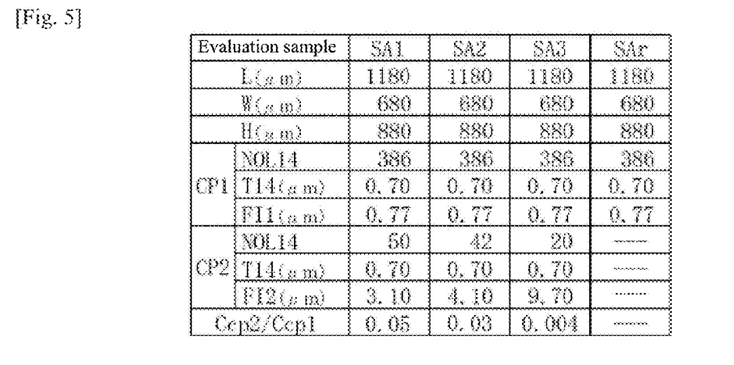
FIG. 5 is a table showing the respective specifications of evaluation samples.

Next, the specifications of evaluation samples SA1, SA2, SA3 and SAr prepared to confirm the effects are explained by citing FIG. 5. Since evaluation samples SA1, SA2, and SA3 correspond to the multilayer ceramic capacitor 10 shown in FIG. 2 to FIG. 4, and evaluation sample SAr corresponds to the conventional multilayer ceramic capacitor 100 shown in FIG. 1, the symbols used in each figure are carried over as deemed appropriate in the text below.

Although not shown in FIG. 5, with evaluation samples SA1, SA2, SA3, and SAr, the first protective part PP1, respective dielectric layers 15 (105), and second protective part PP2 are formed by dielectric ceramics whose primary constituent is barium titanate, while the respective internal electrode layers 14 (104) are formed by good conductors whose primary constituent is nickel. Additionally, with evaluation samples SA1, SA2, SA3, and SAr, the first external electrode 12 (102) and second external electrode 13 (103) each have a thickness (reference dimension) of 30 µm, and a length of the wrap-around part (reference dimension) of 250 µm.

As shown in FIG. 5, evaluation samples SA1, SA2, and SA3 have the same length L, width W, and height H (all reference dimensions), which are also the same as the length, width, and height (all reference dimensions) of evaluation sample SAr. In addition, the number of layers NOL14, thickness T14 (reference dimension), and facing distance FI1 (reference dimension) with respect to the internal electrode layers 14 included in the high-capacitance part CP1 are the same for evaluation samples SA, SA2, and SA3, which are also the same as the number of layers, thickness (reference dimension), and facing distance (reference dimension) with respect to the internal electrode layers 104 included in the capacitive part CP of evaluation sample SAr.

The specification of evaluation samples SA1, SA2, and SA3 differ in that the number of layers NOL14 and facing distance FI2 with respect to the internal electrode layers 14 included in the low-capacitance part CP2 are different with each sample. To be specific, while the internal electrode layers 14 included in the low-capacitance parts CP2 of evaluation samples SA1, SA2, and SA3 have the same thickness T14 (reference dimension), the number of layers NOL14 and facing distance FI2 (reference dimension) with respect to the internal electrode layers 14 included in the low-capacitance part CP2 of evaluation sample SA1 are 50 and 3.10 µm, respectively; the number of layers NOL14 and facing distance FI2 (reference dimension) with respect to the internal electrode layers 14 included in the low-capacitance part CP2 of evaluation sample SA2 are 42 and 4.10 µm, respectively; and the number of layers NOL14 and facing distance FI2 (reference dimension) with respect to the internal electrode layers 14 included in the low-capacitance part CP2 of evaluation sample SA3 are 20 and 9.70 µm, respectively. It should be noted that evaluation sample SAr does not have any low-capacitance part CP2 like what evaluation samples SA1, SA2 and SA3 have.

"Ccp2/Ccp1" shown in FIG. 5 indicates the ratio of the capacitance Ccp2 of the low-capacitance part CP2 to the capacitance Ccp1 of the high-capacitance part CP1. To be specific, the low-capacitance parts CP2 of evaluation samples SA1, SA2, and SA3 are all forming capacitance, albeit low, with evaluation sample SA1 having a Ccp2/Ccp1 of 0.05, evaluation sample SA2 having a Ccp2/Ccp1 of 0.03, and evaluation sample SA3 having a Ccp2/Ccp1 of 0.004. It should be noted that, because evaluation sample SAr does not have any low-capacitance part CP2 like what evaluation samples SA1, SA2 and SA3 have, "Ccp2/Ccp1" cannot be calculated for this sample.

<<Evaluation of Noise Suppression>>

Next, the results of noise suppression evaluation using the aforementioned evaluation samples SA1, SA2, SA3, and SAr are explained.

For the evaluation, the necessary number of boards were prepared, each having two conductor pads formed on it, and the bottom faces, in the height direction, of the first external electrodes 12 (102) and second external electrodes 13 (103) of evaluation samples SA1, SA2, SA3, and SAr were connected to the two conductor pads of a board via solder, respectively, and 10 such evaluation boards were produced for each evaluation sample. Incidentally, the board was made of epoxy resin, board thickness was 800 µm, each conductor pad was made of copper, each conductor pad had a thickness of 35 µm, each conductor pad had a rectangular shape of 500 µm in width and 550 µm in length, tin-antimony solder was used, and amount of solder was equivalent to 50 µm of applied thickness of cream solder.

Next, alternating current voltage of 5 V was applied to the two conductor pads on the total 40 evaluation boards by gradually raising the frequency from 0 to 1 MHz, and the maximum volume of sound generating in each audible frequency range (between 20 Hz and 20 kHz) during the voltage application was measured separately using the TYPe-3560-B130 (manufactured by Bruel & Kjær Japan) in a soundproof anechoic chamber (manufactured by Yokohama Sound Environment Systems), and the average maximum sound volume was calculated for each evaluation sample.

As a result of calculation, the average maximum sound volume of evaluation sample SA1 was 18.6 dB, average maximum sound volume of evaluation sample SA2 was 18.3 dB, average maximum sound volume of evaluation sample SA3 was 18.4 dB, and average maximum sound volume of evaluation sample SAr was 18.7 dB, all of which was lower than the ideal upper limit of noise of 25 dB. In essence, it can be said that evaluation samples SA1, SA2, and SA3 corresponding to the multilayer ceramic capacitor 10 shown in FIG. 2 to FIG. 4 are all effective in suppressing noise.

<<Evaluation of ESL Reduction>>

Next, the results of ESL reduction evaluation using the aforementioned evaluation samples SA1, SA2, SA3, and SAr are explained.

For the evaluation, 10 evaluation boards similar to those mentioned above were produced for each evaluation sample, after which frequencies ranging from 1 MHz to 2 GHz were applied at an operation level of 0 dBm to the two conductor pads on each evaluation board, and the ESL (ESL characteristics) generating during the frequency application was measured separately using the 4991A (manufactured by Agilent Technology), and the average at each frequency was calculated for each evaluation sample.

Figure 6:
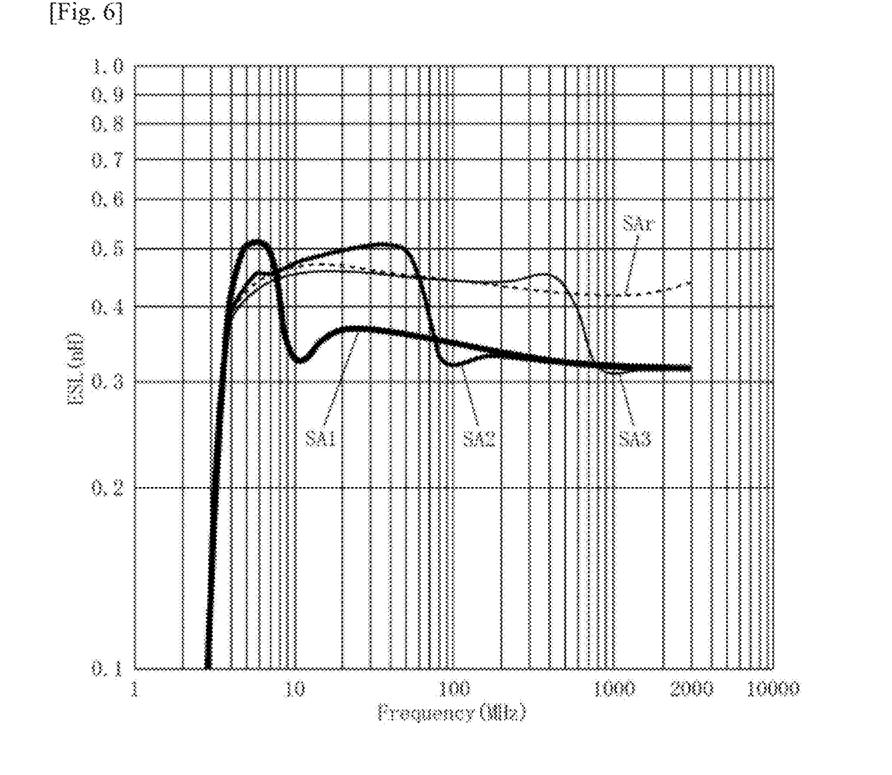
FIG. 6 is a graph showing the respective ESL characteristics of evaluation samples shown in FIG. 5.

FIG. 6 shows the ESL characteristics line of each evaluation sample, drawn by plotting the average at each frequency on a graph whose horizontal axis and vertical axis represent frequency (MHz) and ESL (nH), respectively. As is evident from FIG. 6, the ESL of evaluation sample SA1 is lower than the ESL of evaluation sample SAr in the frequency range of 7.5 MHz to 2 GHz, the ESL of evaluation sample SA2 is lower than the ESL of evaluation sample SAr in the frequency range of 75 MHz to 2 GHz, and the ESL of evaluation sample SA3 is lower than the ESL of evaluation sample SAr in the frequency range of 4 MHz to 100 MHz and the frequency range of 550 MHz to 2 GHz.

When compared to the ESL characteristics of evaluation sample SAr, evaluation samples SA1, SA2, and SA3 are all superior in terms of ESL characteristics in that their ESL in the frequency range of 550 MHz to 2 GHz was lower than the ESL of evaluation sample SAr in the same frequency range. In essence, evaluation samples SA1, SA2, and SA3 corresponding to the multilayer ceramic capacitor 10 shown in FIG. 2 to FIG. 4 are all effective in reducing the ESL in the high-frequency ranges of 550 MHz or higher, which means that, even when they are used as a component of a high-frequency circuit, their capacitor body can demonstrate the intended capability.

As mentioned earlier, evaluation samples SA1, SA2, and SA3 differ structurally from evaluation sample SAr in that their high-capacitance part CP1 and low-capacitance part CP2 exist successively in the height direction, separated by the common internal electrode layer 14co, where the low-capacitance part CP2, which evaluation sample SAr does not have, can be characterized by the value of "Ccp2/Ccp1" shown in FIG. 5 or by the values of "FI1" and "FI2" also shown in FIG. 5.

In other words in view of the value of "Ccp2/Ccp1" shown in FIG. 5, it can be said that similar ESL reduction effect can be demonstrated so long as the capacitance Ccp1 of the high-capacitance part CP1 and capacitance Ccp2 of the low-capacitance part CP2 satisfy the condition of "0.004≤Ccp2/Ccp1≤0.05." Also, in other word in view of the values of "FI1" and "FI2" shown in FIG. 5, it can be said that similar ESL reduction effect can be demonstrated so long as the facing distance FI1 of the internal electrode layers 14 included in the high-capacitance part CP1 and facing distance FI2 of the internal electrode layers 14 included in the low-capacitance part CP2 satisfy the condition of "4.0≤FI2/FI1≤12.6."

Also, when compared to the ESL characteristics of evaluation sample SAr, evaluation samples SA1, SA2, and SA3 are individually superior in terms of ESL characteristics in that ESL reduction was done over wide frequency ranges including the high-frequency range in the case of evaluation sample SA1, ESL reduction was done especially in the high-frequency range in the case of evaluation sample SA3, and ESL reduction had an intermediate characteristic between evaluation samples SA1 and SA3 in the case of evaluation sample SA2. In essence, evaluation samples SA1, SA2, and SA3 corresponding to the multilayer ceramic capacitor 10 shown in FIG. 2 to FIG. 4 have different frequency ranges that are effective in reducing their ESL, which means that when they are used as a component of a high-frequency circuit, they can be used selectively while considering its service frequency range, thereby properly achieving ESL reduction effect suited for the service frequency range.

<<Supplemental Information on Evaluation Samples SA1, SA2, and SA3>>

1) Evaluation samples SA1, SA2, and SA3 explained by citing FIG. 5 had a length L (reference dimension) of 1180 µm, width W (reference dimension) of 680 µm, and height H (reference dimension) of 880 µm; however, noise suppression effect and ESL reduction effect similar to those mentioned above can be achieved so long as the condition of "Length L>Height H>Width W" is satisfied based on reference dimensions, even when the values of length L, width W, and height H are different from the values mentioned above. Certainly, noise suppression effect and ESL reduction effect similar to those mentioned above can be achieved so long as structurally the high-capacitance part CP1 and low-capacitance part CP2 exist successively in the height direction, separated by the common internal electrode layer 14co, even when the condition of "Length L>Width W=Height H" or condition of "Length L>Width W>Height H" is satisfied based on reference dimensions.

2) Evaluation samples SA1, SA2, and SA3 explained by citing FIG. 5 had a number of layers NOL14 of 386, thickness T14 (reference dimension) of 0.70 µm, and facing distance FI1 (reference dimension) of 0.77 µm, respectively, with respect to the internal electrode layers 14 included in the high-capacitance part CP1, and a number of layers NOL14 of 50, 42, and 20, respectively, thickness T14 (reference dimension) of 0.70 µm, and facing distance FI2 (reference dimension) of 3.10 µm, 4.10 µm, and 9.70 µm, respectively, with respect to the internal electrode layers 14 included in the low-capacitance part CP2; however, noise suppression effect and ESL reduction effect similar to those mentioned above can be achieved so long as structurally the high-capacitance part CP1 and low-capacitance part CP2 exist successively in the height direction, separated by the common internal electrode layer 14co, even when the number of layers NOL14, thickness T14, and facing distance FI1 with respect to the internal electrode layers 14 included in the high-capacitance part CP1, and the number of layers NOL14, thickness T14 (reference dimension), and facing distance FI2 with respect to the internal electrode layers 14 included in the low-capacitance part CP2, are different from the values mentioned above.

3) Evaluation samples SA1, SA2, and SA3 explained by citing FIG. 5 used dielectric ceramics containing barium titanate as a primary constituent and 0.3 mol of manganese oxide, 0.5 mol of holmium oxide, and 1.0 mol of silicon dioxide relative to 100 mol of barium titanate as secondary constituents, for the first protective part PP1, respective dielectric layers 15, and second protective part PP2; however, noise suppression effect and ESL reduction effect similar to those mentioned above can be achieved so long as the dielectric ceramics used for the respective parts are dielectric ceramics of ∈>1000 or Class 2 (high dielectric constant type), even when at least one of the primary constituent and secondary constituents differs from those mentioned above. Additionally, while the aforementioned samples used dielectric ceramics of the same primary constituent and secondary constituents for the first protective part PP1, respective dielectric layers 15, and second protective part PP2, noise suppression effect and ESL reduction effect similar to those mentioned above can be achieved so long as the dielectric ceramics used for the first protective part PP1, respective dielectric layers 15, and second protective part PP2 are dielectric ceramics of $\in$>1000 or Class 2 (high dielectric constant type), even when at least one of the primary constituent and secondary constituents differs among the respective dielectric layers 15, first protective part PP1, and second protective part PP2.

In some embodiments, the average facing distance of internal electrode layers in the low-capacitance part is wider than that in the high-capacitance part. In some embodiments, the facing distance of every pair of internal electrode layers is substantially the same in the low-capacitance part, and also, the facing distance of every pair of internal electrode layers is substantially the same in the high-capacitance part.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2014-264273, filed Dec. 26, 2014, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor, having a capacitor body shaped roughly as a rectangular solid defined by length, width, and height, a first external electrode provided on one of opposing ends of the capacitor body, and a second external electrode provided on the other of the opposing ends of the capacitor body:
   wherein the capacitor body has a first protective part constituted by dielectrics, a capacitive part formed by an N number (N is an integer of 3 or greater) of internal electrode layers stacked alternately with dielectric layers, and a second protective part constituted by dielectrics, all of which are arranged in layers continuously stacked in this order in a height direction;
   wherein the N number of internal electrode layers are such that each has an equivalent profile shape, and an edge, on the first external electrode side, of an odd-numbered layer counted from one end in the height direction is electrically connected to the first external electrode, while an edge, on the second external electrode side, of an even-numbered layer counted from the one end in the height direction is electrically connected to the second external electrode;
   wherein the capacitive part consists of one high-capacitance part and one low-capacitance part in the height direction, sharing one common internal electrode layer among the N number of internal electrode layers other than a top layer and a bottom layer; and
   wherein the one low-capacitance part consists of an n2 number of internal electrode layers stacked alternately with dielectric layers (n2 is an integer of 2 or greater, including the common internal electrode layer) and the one high-capacitance part consists of an n1 number of internal electrode layers stacked alternately with dielectric layers (n1 is an integer of 2 or greater, including the common internal electrode layer), wherein a facing distance between adjacent internal electrode layers of all the n2 number of internal electrode layers constituting the low-capacitance part is wider than a facing distance between adjacent internal electrode layers of all the n1 number of internal electrode layers constituting the high-capacitance part,
   wherein a condition of "$4.0 \leq FI2/FI1 \leq 12.6$" is satisfied where FI1 represents the facing distance of the n1 number of internal electrode layers included in the high-capacitance part and FI2 represents the facing distance of the n2 number of internal electrode layers included in the low-capacitance part.

2. A multilayer ceramic capacitor according to claim 1, satisfying a condition of "$0.004 \leq Ccp2/Ccp1 \leq 0.05$" where Ccp1 represents a capacitance of the high-capacitance part and Ccp2 represents a capacitance of the low-capacitance part.

3. A multilayer ceramic capacitor according to claim 2, satisfying the condition of "L>H>W" where L represents the length, W represents the width, and H represents the height, of the multilayer ceramic capacitor.

4. A multilayer ceramic capacitor according to claim 1, satisfying the condition of "L>H>W" where L represents the length, W represents the width, and H represents the height, of the multilayer ceramic capacitor.

* * * * *